(12) United States Patent
Ganesh et al.

(10) Patent No.: US 6,957,236 B1
(45) Date of Patent: Oct. 18, 2005

(54) PROVIDING A USEABLE VERSION OF A DATA ITEM

(75) Inventors: Amit Ganesh, San Jose, CA (US);
Srinivas S. Vemuri, Foster City, CA (US); Roger J. Bamford, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 482 days.

(21) Appl. No.: 10/263,493

(22) Filed: Oct. 2, 2002

Related U.S. Application Data

(60) Provisional application No. 60/379,899, filed on May 10, 2002.

(51) Int. Cl.⁷ ............................................ G06F 17/30
(52) U.S. Cl. ................................................. 707/204
(58) Field of Search ............................... 707/200–204, 707/1–10; 709/227; 714/6

(56) References Cited

U.S. PATENT DOCUMENTS

| | | | | |
|---|---|---|---|---|
| 5,794,228 | A | * | 8/1998 | French et al. .................... 707/2 |
| 5,794,229 | A | * | 8/1998 | French et al. .................... 707/2 |
| 5,806,076 | A | | 9/1998 | Ngai et al. |
| 5,857,207 | A | * | 1/1999 | Lo et al. ...................... 707/203 |
| 5,870,764 | A | * | 2/1999 | Lo et al. ...................... 707/203 |
| 5,873,098 | A | | 2/1999 | Bamford et al. |
| 6,192,377 | B1 | | 2/2001 | Ganesh et al. |
| 6,237,001 | B1 | | 5/2001 | Bamford et al. |
| 6,256,748 | B1 | * | 7/2001 | Pinson ........................... 714/6 |
| 6,564,215 | B1 | * | 5/2003 | Hsiao et al. ..................... 707/8 |
| 6,606,660 | B1 | * | 8/2003 | Bowman-Amuah ......... 709/227 |
| 6,772,155 | B1 | * | 8/2004 | Stegelmann .................... 707/8 |
| 6,845,384 | B2 | * | 1/2005 | Bamford et al. ............ 707/205 |

OTHER PUBLICATIONS

Luciano Lenzini et al., Trade-offs between low complexity, low latency, and fairness with deficit round-round schedulers, 8-200 ACM Press, vol. 12, Issue 4, IEEE/ACM Transactions on Networking (TON), pp. 681-693.*

(Continued)

*Primary Examiner*—Diane D. Mizrahi
(74) *Attorney, Agent, or Firm*—Hickman Palermo Truong & Becker LLP

(57) ABSTRACT

Techniques are provided for providing a data item to a transaction in a multi-versioning system in which the data item may exist on multiple versions of a data block, and were versioning is performed at the granularity of the data block. According to one aspect of the invention, the technique involves locating, within volatile memory, a first version of a data block that includes a first version of the data item. It is then determined whether the first version of the data item is useable by the transaction without respect to whether the first version of the data block is generally useable by the transaction. If the first version of the data item is usable by the transaction, then the data item is established as a candidate that can be provided to the transaction. Thus, the data item within a block may be considered a candidate to be provided to a transaction even when the version of the data block on which the data item resides would otherwise disqualify the data block from being seen by that transaction. If the first version of the data item is not usable by the transaction, then a version of the data item that is usable by the transaction is obtained from a second version of the data block that is different from the first version.

28 Claims, 3 Drawing Sheets

OTHER PUBLICATIONS

D. Kim et al., Leveraging cache coherence in active memory systems, 2002, ACM Press, Inter. Conference on Supercomputin pp. 2-13.*

Dr. Richard Taylor, "Concurrency in the Data Warehouse," Proceedings of the 26th International Conference on Very Large Databases, Cairo, Egypt, 2000, XP-002254905, pp. 724-727.

* cited by examiner

US 6,957,236 B1

PROVIDING A USEABLE VERSION OF A DATA ITEM

CLAIM OF PRIORITY

This application claims priority from Provisional Patent Application Ser. No. 60/379,899, filed May 10, 2002, entitled "Providing a Useable Version of a Data Item", and naming as inventors AMIT GANESH, SRINIVAS S. VEMURI and ROGER J. BAMFORD, the entire disclosure of which is hereby referenced as if fully set forth herein.

FIELD OF THE INVENTION

The present invention relates to database systems, and more specifically, to a method for determining whether a transaction in a database system can use a version of a data item.

BACKGROUND OF THE INVENTION

In typical database systems, users store, update and retrieve information by submitting commands to a database server. To be correctly processed by the database server, the commands must comply with the database language that is supported by the database server. One popular database language is known as Structured Query Language (SQL).

The term "data item" is used herein to refer to any value or set of values associated with any logical data type or structure. Within a relational database system, typical data items include tables, rows, fields within rows, indexes, index entries, disk blocks, etc.

In multi-versioning database systems, several versions of the same data item may exist. Typically, one version of the data item is "current" (i.e. reflects all of the changes that have been made to that data item) and other versions are non-current. The non-current versions typically reflect what the current version looked like at previous points in time.

There are various types of multi-versioning database systems. Some multi-versioning database systems durably store multiple versions of a data item. Other multi-versioning database systems durably store one version of the data item, and recreate other versions as needed by applying undo or redo records to remove or add changes. The techniques described herein are not limited to any particular type of multi-versioning system.

Multi-versioning database systems typically perform versioning at a particular level of granularity. Thus, rather than keep (or generate) separate copies of an entire table, multi-versioning systems typically keep (or generate) separate copies of relatively small chunks of a table. For the purpose of explanation, the chunks that represent the granularity level at which a system manages versioning shall be referred to herein as "data blocks".

In contemporary database systems, copies of data blocks contained in the database are often stored in a volatile memory, which requires less time to access than non-volatile memory, to improve transaction processing performance. In multi-versioning database systems, multiple copies of the same data block may be maintained in volatile memory so that concurrently executing transactions can simultaneously access different versions of the data items contained therein.

In the context of database systems, a transaction is a logical unit of work that is comprised of one or more database language statements. When a database system executes a transaction, the transaction may read or update a data item that was written or updated in response to the execution of previous transactions. Consequently, the results returned by the database system in response to executing any given transaction are typically dictated by changes made by a set of previously executed transactions.

Because each transaction must see a database in a consistent state, not all versions of a data item can necessarily be used by a transaction. For example, for a transaction to see a consistent view of that data item, the transaction may need to see certain updates that were made to the data item. However, some versions of the data block that contains the data item may not contain the updates that must be seen by a transaction. On the other hand, other versions of the data block that contains the data item may contain updates that cannot be seen by the transaction. Hence, in situations where multiple versions of a data block are available to transactions, access to the versions of a data item by transactions must be managed so that database consistency is maintained.

For the purpose of explanation, the term "transaction" shall be used herein to more generally refer to any entity that, for any reason, is allowed to use some but not all of the possible versions of a data item.

When a system includes multiple nodes, each of which has its own cache, it is even more critical to use efficient techniques for providing a "useable version" of a data item to a transaction. For example, assume that a transaction running on a particular node requires a particular version of a data item. If the required version of the data item is in a data block within the cache of that particular node, then the desired version of the data item can be supplied from that data block to the transaction with minimal overhead. However, the act of providing the required version can be extremely inefficient if the data block that contains the required version of the data item resides (1) only on disk, (2) in the cache of a different node; or (3) must be reconstructed based on information that is on disk or in the cache of a different node.

Based on the foregoing, it is desirable to provide efficient techniques for providing useable versions of data items to transactions.

SUMMARY OF THE INVENTION

Techniques are provided for providing a data item to a transaction in a multi-versioning system in which the data item may exist on multiple versions of a data block. According to one aspect of the invention, the technique involves locating, within volatile memory, a first version of a data block that includes a first version of the data item. It is then determined whether the first version of the data item is useable by the transaction without respect to whether the first version of the data block is useable by the transaction. If the first version of the data item is usable by the transaction, then the data item is established as a candidate that can be provided to the transaction. Thus, the data item within a block may be considered a candidate to be provided to a transaction even when the version of the data block on which the data item resides is otherwise not useable by that transaction. If the first version of the data item is not usable by the transaction, then a version of the data item that is usable by the transaction is obtained from a second version of the data block that is different from the first version.

Embodiments are described in which the information used to determine whether a version of the row is useable includes a snapshot time associated with the transaction. Embodiments are also described in which the information used to determine whether a version of a row is useable includes a MUST-SEE time and a CANNOT-SEE time. Various approaches for selecting among multiple useable candidates are also described.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
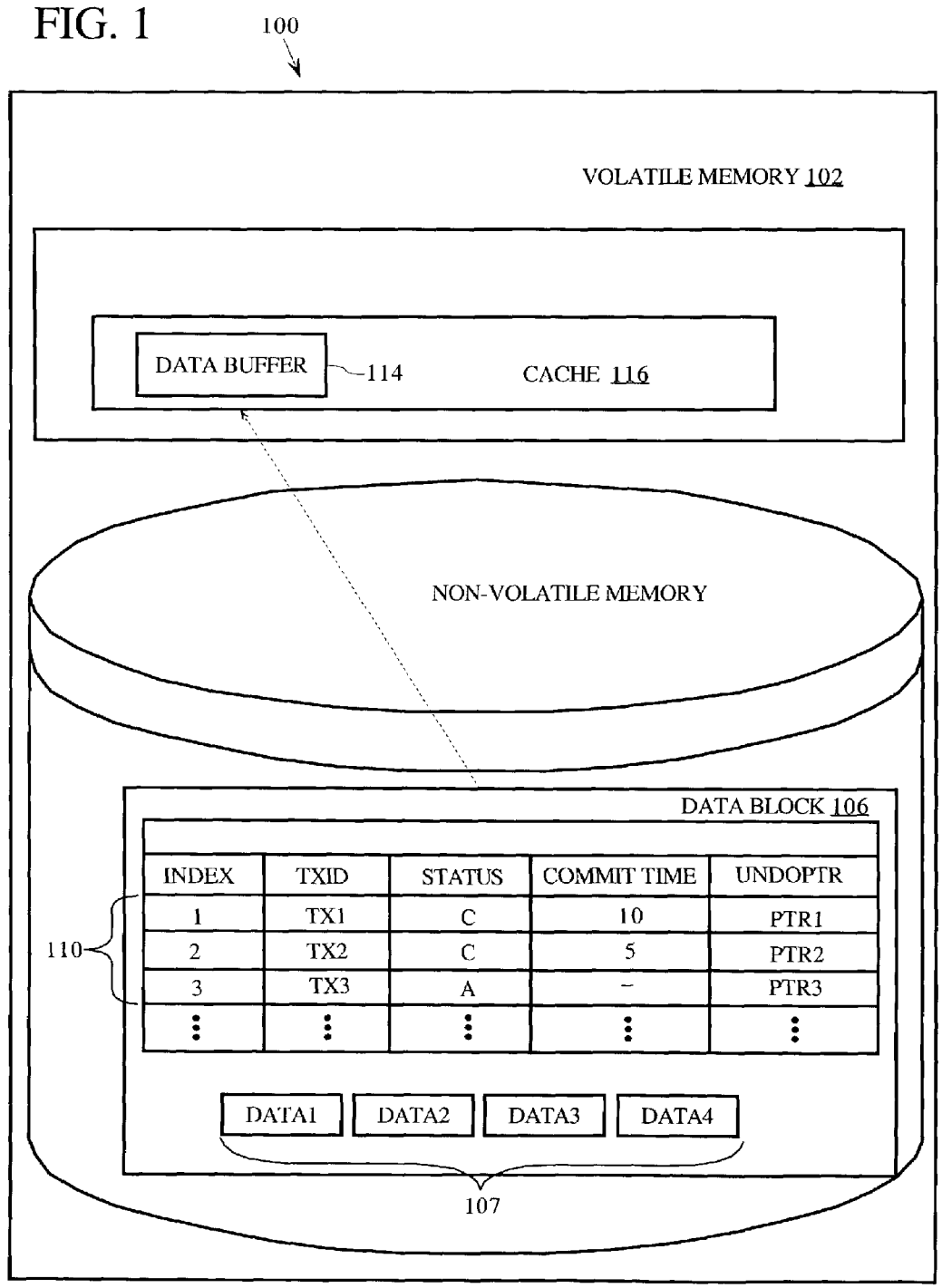
FIG. 1 is a block diagram of a system within which embodiments of the invention may be implemented.

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

An approach is provided for determining whether a transaction can use a particular version of a data item. In contrast to prior approaches, the determination of whether the particular version of the data item is useable is made even though the version of the data block that contains that particular version of the data item is not generally usable by the transaction. Specifically, even though a particular version of a data block may include changes that are too recent to be seen by the transaction, the specific data item in which the transaction is interested may not contain any such changes, and may therefore still be useable by the transaction.

According to one embodiment, determining whether a particular version of the data item is useable involves determining whether the data item within the data block is locked. If the data block is not locked, then the last transaction to update that version of the data item has already committed, and would therefore have been assigned a commit time. For the purpose of explanation, the commit time of the latest transaction that updated a particular version of a data item within a data block shall be referred to herein as the "freshness time" of that version of the data item.

It should be noted that the latest transaction that updated a particular version of a data item within the block might not be the latest transaction to update the data block itself. In fact, it is possible for that same data block to have other data items that are locked by active transactions, and yet for the particular data item to have a freshness time that is old enough for the interested transaction to use.

If the data item is not locked, then the freshness time of the data item is compared with snapshot information associated with the transaction. As shall be described in greater detail hereafter, the snapshot information associated with a transaction indicates which versions of data the transaction can and cannot see. The comparison between the snapshot information and the freshness time indicates whether that particular version of the data item is useable by the transaction. If that version of the data item is useable by the transaction, then the particular version of the data item may then be provided to the transaction, or added to a pool of candidate versions from which the version that will actually be provided to the transaction is selected.

In many systems, data blocks that that have been updated by a committed transaction are not immediately updated to show that the transaction has committed. Therefore, even if the information in the data block indicates that the data item is locked, the lock may actually be held by a committed transaction. Thus, if, according to the information in the data block, the data item is locked, then it is determined whether the lock is actually held by an active transaction.

If the transaction holding the lock is actually committed, the commit time of the transaction holding the lock is used as the freshness time, and the comparison described above is performed to determine whether the data item is usable.

If the transaction holding the lock in active, then it is determined whether the transaction holding the lock is the same transaction as the transaction that is attempting to use the data item. If the active transaction holding the lock is not the transaction that is attempting to use the data item, then the version of the data item in that block is not useable. On the other hand, if the active transaction holding the lock is the same transaction as the transaction that is attempting to use the data item, then it is determined whether the data item has any changes that are too recent for the transaction to see. If the data item does not have any changes that are too recent for the transaction to see, then the data item is useable by the transaction.

In situations in which there are many versions of a data item that are useable by a transaction, efficiency may be affected by which of the versions are actually provided to the transaction. Various techniques are described herein for determining which version of a data item, within a pool of useable candidates, should be provided to a particular transaction.

Block-Level Version Information

For a multi-versioning system to provide the correct version of information to transactions, the system must maintain information that indicates the version of information. Typically, database systems maintain such versioning information at the data block level of granularity, since that is the level of granularity at which versioning is performed. For example, some database systems maintain an INCLUDE TIME and an EXCLUDE TIME for each version of a data block. The INCLUDE TIME specifies the commit time of the most recently committed transaction whose changes are included in the version of the data block. The EXCLUDE TIME specifies the time at which the contents of the data block were "current".

For example, the EXCLUDE TIME of a data block that was created by rolling back changes would typically be the commit time of the oldest transaction whose changes have been removed from the version of the data block. If a particular version of a data block is the most recent version of the data block, then the EXCLUDE TIME for that version is infinity, since no changes have been removed.

For example, suppose a first transaction causes a copy of a data block to be loaded into a volatile memory, updates the copy of the data block to create a new version (the "first version") of the data block, and then commits at time T10. The INCLUDE TIME for this first version is set to time T10 and the EXCLUDE TIME is set to infinity. Then a second transaction updates the same copy of the data block to create a second version of the data block and commits at time T30. The INCLUDE TIME of the second version of the data block is changed to time T30 to reflect that the second version of the data block includes changes made by a transaction that committed at time T30, while the EXCLUDE TIME remains at infinity, since no changes have been removed from the second version of the data block.

Now suppose that a third transaction requires access to the data block as of time T20. The second version of the data block cannot be used in its current state because it contains an update made by the second transaction that committed at time T30. Therefore, the first version of the data block is reconstructed by removing the change made by the second transaction. Once the reconstruction operation is completed, the INCLUDE TIME of the new copy is changed to time T10, and the EXCLUDE TIME is changed to time T30, to reflect that this version of the data block contains the changes made by the first transaction that committed at time T10, and that the changes made by the second transaction, that committed at time T30, have been removed. Thus, any transaction that requires access to the data block as it existed from time T10 up to, but not including time T30, can use this reconstructed first version of the data block.

Row-Level Version Information

In a typical system, version information is maintained at the granularity of data blocks, since it is at the granularity of data blocks that the system manages versions. However, according to an aspect of the present invention, version information is maintained at the data item granularity, where a single data block may contain multiple data items. The data item version information may be maintained in addition to and/or instead of the data block version information.

Embodiments of the invention are described herein in the context of a transaction, within a database system, that is attempting to access a particular row of a table. The data for the row of the table will typically reside on a data block that includes data for several other rows. Thus, examples will be given in which the data item is a row. Consequently, versioning information is maintained on a row-level granularity. However, rows are merely one example of data items that may reside on data blocks within a multi-versioning system. The present approach is not limited to any particular data items, nor to any particular type of multi-versioning system.

FIG. 1 is a block diagram of a database system 100 that maintains row-level version information for determining whether a transaction can use a particular version of a data item, according to an embodiment of the invention.

Referring to FIG. 1, database system 100 includes a volatile memory 102 and non-volatile memory 104. Non-volatile memory 104 generally represents one or more storage devices, such as magnetic or optical drives, on which a database is stored. A data block 106 is stored on non-volatile memory 104 and contains one or more data items 107. In the illustrated embodiment, data items 107 are identified individually as D1, D2, D3 and D4.

Data block 106 also contains information about transactions that have recently operated on data items 107. Specifically, the transactions listed in entries 110 include the most recent transactions to update each of the data items in data block 106. Such transactions may either be active (in which case the data block will typically indicate that they are holding a lock on the data item), or committed. For example, entries 110 indicate that transactions TX1 and TX2 committed at times 10 and 5, respectively, while transaction TX3 has not yet committed.

When the transaction that last updated a data item is committed, the commit time of the transaction can be considered the version number of the row. Thus, if TX1 is the last transaction to update data item 1 in data block 106, then the version of data item 1 within data block 106 can be considered "10" (the commit time of TX1). Thus, entries 110 convey version information for the data items within data block 106 at the data item level of granularity. As shall be described in greater detail hereafter, having data item level version information allows data items to be provided to transactions even when the data blocks that contain the data items may not be generally useable by the transactions.

In some systems, it is possible for the information within the data block to indicate that a transaction is active when the transaction has actually committed. This phenomenon is due to delays that can occur between the time a transaction commits, and the time the data blocks that were modified by the transaction are updated to indicate that the transaction committed. As shall be described in greater detail hereafter, this phenomenon may be accounted for by determining whether a transaction that is active according to the information in the data block, has actually committed.

The structures shown in system 100 are merely one example of how a multi-versioning system may maintain versioning information at the data item level of granularity. The specific versioning information, and the techniques for maintaining the information, may vary from implementation to implementation. The present invention is not limited to any particular structure or technique for maintaining versioning information at the data item level of granularity.

Snapshot Information

One approach for managing the execution of transactions to maintain database consistency involves making sure that a transaction sees only (1) changes that were committed to the database by a particular set of committed transactions and (2) changes made by prior statements of the transaction itself. The set of transactions whose changes are visible to a statement is referred to as the statement's "snapshot set." Thus, the transaction must see a "snapshot" of the database. A transaction's snapshot includes all changes made by the transactions in its snapshot set, and none of the changes made by any transactions that are not in its snapshot set ("excluded transactions").

According to one technique, a multi-versioning database system can ensure that transactions see a consistent snapshot of the database by assigning to each transaction a snapshot time that corresponds to the state of a database at the time the transaction began executing. For consistent read, a transaction must see all changes made to a database by transactions that committed on or before the snapshot time of the transaction, and cannot see any changes made by transactions that committed after the assigned snapshot time.

The concept of consistent read is described in more detail in U.S. patent application Ser. No. 08/842,169, entitled "SHARING SNAPSHOTS FOR CONSISTENT READS," filed on Apr. 23, 1997, U.S. patent application Ser. No. 08/838, 967, entitled "TECHNIQUES FOR REDUCING THE NUMBER OF SNAPSHOTS OF A DATABASE," filed on Apr. 23, 1997, and U.S. patent application Ser. No. 08/841,541, entitled "DYNAMIC SNAPSHOT SET ADJUSTMENT," filed on Apr. 23, 1997, the contents of each of which are incorporated herein by reference.

As a simple example, suppose a transaction requires access to a version of a data block as it existed at time T15 (i.e. the snapshot time of the transaction is T15). The transaction must be supplied a version of the data item that contains all changes made by transactions that committed on or before time T15, but no changes made by transactions that committed after time T15. Versions of the data item that include updates made by transactions that have not yet committed (except for the requesting transaction itself), or committed after time T15, cannot be used.

Determining Whether a Version of a Data Item is Useable

A method for determining whether a transaction can use a version of a data item, according to an embodiment of the invention, is now described with reference to the flowchart of FIG. 2. The steps identified in FIG. 2 refer to an embodiment in which the data item that is required by the transaction is a row located in a data block within a database system.

In general, the determination of whether the version of the row may be used by the transaction is made by comparing the version information associated with the row to the snapshot information associated with the transaction that requires the row. However, the version information of the row must be determined before it can be compared to the snapshot information of the transaction. Therefore, several of the steps illustrated in FIG. 2 correspond to the act of determining the freshness time of a version of a row.

Figure 2:
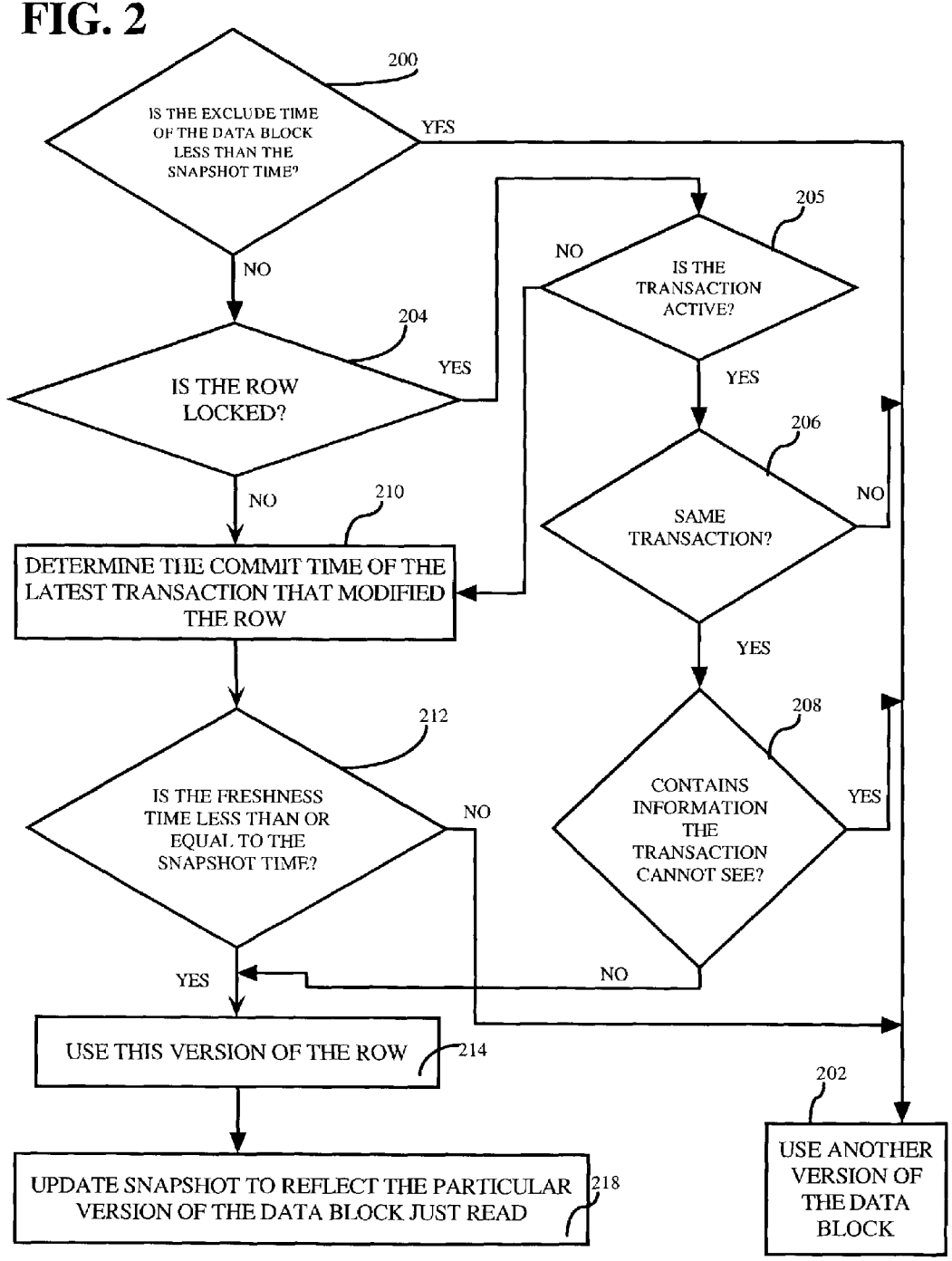
FIG. 2 is a flowchart illustrating steps for determining whether a transaction can use a version of a data item, according to an embodiment of the invention.

Referring to FIG. 2, in step 200 it is determined whether the EXCLUDE time associated with the data block is less than the snapshot time associated with the transaction. If the EXCLUDE time associated with the data block is less than the snapshot time associated with the transaction, then the version of the row that is contained in the data block may be missing changes that must be seen by the transaction. Therefore, control passes to step 202 where the system obtains a correct version of the row from another version of the data block.

If the EXCLUDE time associated with the data block is not less than the snapshot time associated with the transaction, then control passes to step 204. At step 204, a determination is made as to whether the information in the data block indicates that the row is locked. If the row is locked, then control proceeds to step 205. Otherwise, control passes to step 210.

In step 210, the commit time of the latest transaction that modified the version of the row that is within that data block is determined. The commit time may be determined, for example, by inspecting the entry, within entries 110 (FIG. 1), that contains the information for the latest transaction to update the row. The commit time thus determined constitutes the FRESHNESS time of that version of the row.

In step 212, a determination is made as to whether the freshness time is less than or equal to the snapshot time. If not, then the transaction cannot use this version of data block 106 because the version of the row includes a modification that is too new to be seen by the transaction. Under these conditions, control proceeds to step 202 and another version of the data block is used. In some systems, the other version of the block may be generated by applying undo records to the data block in order to remove the changes that are too recent for the transaction to see.

If the freshness time is less than or equal to the snapshot time, then control passes from step 212 to step 214. In step 214, the version of the row is provided to the transaction for the transaction to use. In an alternative embodiment, the version of the row may not be immediately provided to the transaction simply because it is determined that the version is useable by the transaction. Rather, the system may proceed to identify several or all versions of the row that are useable by the transaction. Once the pool of useable candidates is determined, the system may use various criteria for selecting which version of the row is actually provided to the transaction. Various selection criteria may be used, as shall be described in greater detail hereafter.

At step 218, the snapshot information associated with the transaction is updated to reflect the particular version of the row that was supplied to the transaction. This step is performed, for example, in embodiments where the snapshot information identifies a snapshot range. Such embodiments, and the specifics of how the snapshot information is updated, shall be described in greater details hereafter.

If, at step 204, the information contained in the data block indicates that the row is locked, then at step 205 it is determined whether the transaction that holds the lock is truly active. This step is performed because, even though the information in the data block indicates that the row is locked, the transaction that holds the lock may actually have committed, yet the data block had not yet been updated with the commit information of the transaction.

If the transaction that holds the lock is not active, then control passes to step 210 to determine the commit time of the transaction that held the lock (which is the latest transaction to modify the version of the row that is in that version of the data block).

If the transaction that holds the lock is active, then at step 206 it is determined whether the transaction that holds the lock is the same transaction as the transaction that is attempting to read the row. If the transaction that holds the lock is not the same transaction as the transaction that is attempting to read the row, then the version of the row that is in the data block potentially contains information that cannot be seen by the transaction, and control passes to step 202.

If the transaction that holds the lock is the same transaction as the transaction that is attempting to read the row, then at step 208 it is determined whether that version of the row contains information that is too new for the transaction to see. This test is performed because, in some database systems, a transaction is allowed to see changes that it itself has made up to a particular point in time, but no changes that it has made after that particular point in time.

If the version of the row contains information that is too new for the transaction to see, then control passes to step 202. Otherwise, control passes to step 214.

Snapshot Ranges

Instead of a single snapshot time for a transaction, some database systems use MUST-SEE and CANNOT-SEE times to define a dependency range for each transaction, which can provide more flexibility in selecting a convenient version to read. According to this approach, a transaction must see changes made by any transaction that has a commit time at or earlier than the MUST-SEE time. In addition, the transaction cannot see changes made by any transaction having a commit time at or later than the CANNOT-SEE time. The concept of MUST-SEE and CANNOT-SEE time is described in more detail in the applications incorporated by reference as described above.

When used in conjunction with the FRESHNESS time of the version of the data item and the EXCLUDE time for a version of a data block, two conditions must be satisfied for a given transaction to be able to use a version of a data block. First, the CANNOT-SEE time of the given transaction must be greater than the FRESHNESS TIME of the version of the data item. In other words, the most recent transaction whose changes are reflected in the version of the data item must have committed before the CANNOT-SEE time of the given transaction. Second, the MUST-SEE time of the given transaction must be less than the EXCLUDE TIME of the version of the data block. In other words, changes that must be seen by the given transaction cannot have been removed from the version of the data block.

For example, suppose a particular version of a row has a FRESHNESS TIME of T33 and the data block in which that version of the row resides has an EXCLUDE TIME of T39. A transaction having a MUST-SEE time of T30 and a CANNOT-SEE time of T40 requests access to the data block. Since the FRESHNESS TIME is less than the CANNOT-SEE time and the EXCLUDE TIME is greater than the MUST-SEE time, the particular version of the data block can be supplied to this transaction.

Updating Snapshot Range after a Read

In embodiments that use a snapshot range, the range may have to be adjusted after a version of a data item is supplied to the transaction. For example, if the transaction is provided a version of a data item with a freshness time of T13, then the transaction must thereafter see all data committed as of time T13. Consequently, if the MUST-SEE time of a transaction is T12 prior to reading the version of the data item, then the MUST-SEE time of the transaction must be adjusted to time T13 after reading the data item. Accordingly, the MUST-SEE time for the transaction is changed to the greater of the current MUST-SEE time in the FRESHNESS TIME.

In addition, if a transaction reads data from which changes had been removed by a particular transaction that has committed, then reading transaction cannot thereafter see any changes made to any data by transactions that committed on or after that particular transaction. Accordingly, the CANNOT-SEE time for the reading transaction is changed to the lesser of the current CANNOT-SEE time of the transaction and the EXCLUDE TIME of the data block that contains the data item that was read.

Selecting Among Available Candidates

As mentioned above, when a version of a data item is provided to a transaction, the CANNOT-SEE time and the MUST-SEE time are adjusted. The effect of this adjustment is to narrow the range of snapshots that the transaction may see in future reads. Different useable versions of a data item may affect the range in different ways. Consequently, where several useable versions of a data item are present, the efficiency of the system may be affected based on which useable version is selected as the version to be provided to the transaction.

According to one embodiment, the selection of the candidate from the pool of candidates is based on the effect that using the candidate will have on the snapshot range of the reading transaction. For the purpose of illustration, assume that the pool of candidate versions includes the following:

| Version | FRESHNESS | EXCLUDE TIME |
|---------|-----------|--------------|
| V1      | T10       | T30          |
| V2      | T15       | T33          |
| V3      | T9        | T20          |

Assume that the transaction that requires the data item has a MUST-SEE time of T11, and a CANNOT-SEE time of T32. In this scenario, versions V1, V2 and V3 are all useable candidates because, for all three versions, the FRESHNESS time is less than the CANNOT-SEE time, and the MUST-SEE time is less than the EXCLUDE TIME.

The [MUST-SEE, CANNOT SEE] range that would result from providing V1 is [T11, T30]. The [MUST-SEE, CANNOT SEE] range that would result from providing V2 is [T15, T32]. The [MUST-SEE, CANNOT SEE] range that would result from providing V3 is [T11, T20].

According to one embodiment, the version to provide to the transaction is selected from the useable candidates based on the size of the [MUST-SEE, CANNOT SEE] range that will remain after the version is provided to the transaction. The such an embodiment, V1 would be provided to the transaction because the range [T11, T30] is larger than the other ranges.

According to an alternative embodiment, the version to provide to the transaction is selected from the useable candidates based on the candidate that would result in the latest CANNOT SEE time. In such an embodiment, V2 would be provided to the transaction because T32 is later than the CANNOT-SEE times that would result from using any of the other candidates. This embodiment is useful, for example, because it attempts to allow the transaction to see newer versions of data.

The above embodiments merely illustrate two examples of criteria that may be used to select which candidate, from a pool of candidates, will actually be provided to a transaction. In alternative embodiments, different criteria may be considered instead of, or in addition to, the criteria specified in these examples. Further, some embodiments may simply provide the first useable candidate that is identified, rather than identify a pool of useable candidates.

Hardware Overview

Figure 3:
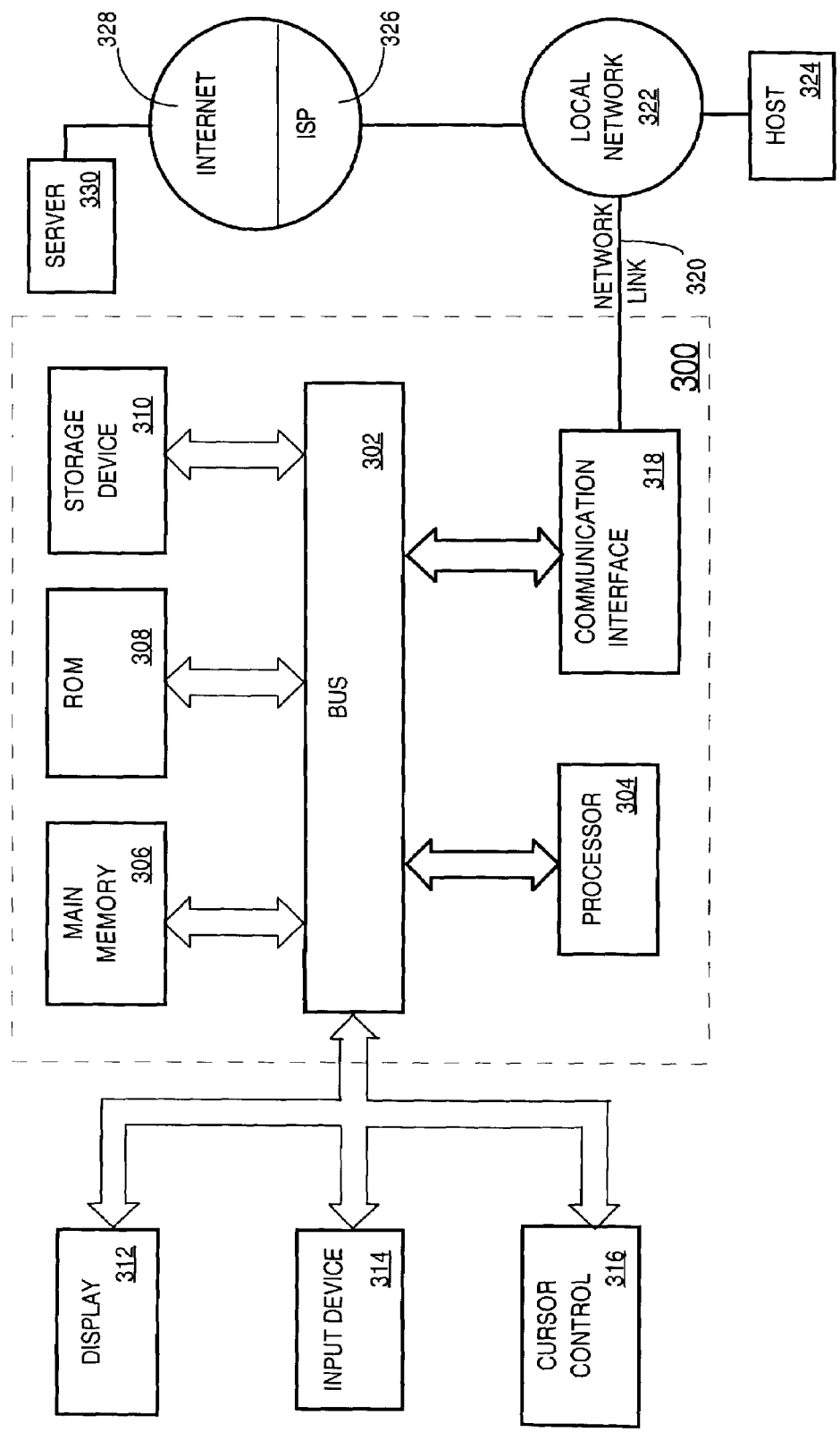
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for determining whether a transaction can use a version of a data item. According to one embodiment of the invention, determining whether a transaction can use a version of a data item is provided by computer system 300 in response to processor 304 executing sequences of instructions contained in main memory 306. Such instructions may be read into main memory 306 from another computer-readable medium, such as storage device 310. Execution of the sequences of instructions contained in main memory 306 causes processor 304 to perform the process steps described herein. Multi-processing arrangements may be used in place of processor 304 to perform the process steps.

In alternative embodiments, hard-wired circuitry may be used in place of or in combination with software instructions to implement the invention. Thus, embodiments of the invention are not limited to any specific combination of hardware circuitry and software. In addition, multi-processor systems may be employed in place of processor 304.

The term "computer-readable medium" as used herein refers to any medium that participates in providing instructions to processor 304 for execution. Such a medium may take many forms, including but not limited to non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying sequences of instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector coupled to bus 302 can receive the data carried in the infra-red signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for determining whether a transaction can use a version of a data item.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for providing a data item to a transaction, the method comprising the steps of:
   locating, within volatile memory, a first version of a data block that includes a first version of the data item;
   determining whether the first version of the data item is useable by the transaction without respect to whether the first version of the data block is useable by the transaction;
   if the first version of the data item is usable by the transaction, then establishing said data item as a candidate that can be provided to said transaction; and
   if the first version of the data item is not usable by the transaction, then obtaining a version of the data item that is usable by the transaction from a second version of the data block that is different from said first version.

2. The method of claim 1 further comprising the step of generating the second version of the data block by modifying the first version of the data block.

3. The method of claim 1 wherein the step of obtaining a version of the data item that is usable by the transaction from a second version of the data block is performed by obtaining the version of the data item that is useable from a version of the data block that is maintained separate from the first version of the data block.

4. The method of claim 1 wherein the step of determining whether the first version of the data item is useable by the transaction includes the step of comparing version information associated with the data item with snapshot information associated with the transaction.

5. The method of claim 4 wherein the step of comparing version information associated with the data item with snapshot information associated with the transaction includes comparing version information associated with the data item with a snapshot time associated with the transaction.

6. The method of claim 4 wherein the step of comparing version information associated with the data item with snapshot information associated with the transaction includes comparing version information associated with the data item with a MUST-SEE time and a CANNOT-SEE time associated with the transaction.

7. The method of claim 4 wherein:
the step of comparing version information associated with the data item with snapshot information associated with the transaction includes comparing a freshness time associated with the data item with snapshot information associated with the transaction; and
the freshness time indicates a commit time of a committed transaction that most recently updated the first version of the data item within the first version of the data block.

8. The method of claim 7 further comprising the step of identifying the freshness time by performing the steps of:
determining whether the first version of the data item is locked;
if the first version of the data item is locked, then determining whether the transaction that holds a lock on the first version of the data item has actually committed; and
if the transaction that holds the lock on the first data item has actually committed, then using a commit time of said transaction that holds the lock as the freshness time of said data item.

9. The method of claim 7 further comprising the step of identifying the freshness time by performing the steps of:
determining whether the first version of the data item is locked;
if the first version of the data item is locked, then determining whether the transaction that holds a lock on the first version of the data item has actually committed; and
if the transaction that holds the lock on the first data item has not actually committed, then determining whether the transaction that holds the lock on the first data item is the transaction that requires the data item; and
if the transaction that holds the lock on the first data item is not the transaction that requires the data item, then determining that the first version of the data item is not useable by the transaction.

10. The method of claim 1 wherein:
the first version of the data item is established as one candidate of a plurality of candidates that are versions of the data item that are useable by the transaction; and
the method includes the step of selecting which candidate of the plurality of candidates to provide to said transaction.

11. The method of claim 1 wherein:
the transaction is a transaction performed within a multi-versioning database system; and
the data item is a row of a table within said database system.

12. The method of claim 10 wherein the step of selecting which candidate of the plurality of candidates to provide to said transaction is performed based on how the candidate affects a range associated with the transaction, wherein said range is bounded by a MUST-SEE time and a CANNOT-SEE time.

13. The method of claim 12 wherein the step of selecting which candidate of the plurality of candidates to provide is based on which candidate would result in the widest range for the transaction.

14. The method of claim 12 wherein the step of selecting which candidate of the plurality of candidates to provide is based on which candidate would result in the highest CANNOT-SEE time.

15. A computer-readable medium carrying instructions for providing a data item to a transaction, the instructions comprising instructions for performing the steps of:
locating, within volatile memory, a first version of a data block that includes a first version of the data item;
determining whether the first version of the data item is useable by the transaction without respect to whether the first version of the data block is useable by the transaction;
if the first version of the data item is usable by the transaction, then establishing said data item as a candidate that can be provided to said transaction; and
if the first version of the data item is not usable by the transaction, then obtaining a version of the data item that is usable by the transaction from a second version of the data block that is different from said first version.

16. The computer-readable medium of claim 15 further comprising instructions for performing the step of generating the second version of the data block by modifying the first version of the data block.

17. The computer-readable medium of claim 15 wherein the step of obtaining a version of the data item that is usable by the transaction from a second version of the data block is performed by obtaining the version of the data item that is useable from a version of the data block that is maintained separate from the first version of the data block.

18. The computer-readable medium of claim 15 wherein the step of determining whether the first version of the data item is useable by the transaction includes the step of comparing version information associated with the data item with snapshot information associated with the transaction.

19. The computer-readable medium of claim 18 wherein the step of comparing version information associated with the data item with snapshot information associated with the transaction includes comparing version information associated with the data item with a snapshot time associated with the transaction.

20. The computer-readable medium of claim 18 wherein the step of comparing version information associated with the data item with snapshot information associated with the transaction includes comparing version information associated with the data item with a MUST-SEE time and a CANNOT-SEE time associated with the transaction.

21. The computer-readable medium of claim 18 wherein:
the step of comparing version information associated with the data item with snapshot information associated with the transaction includes comparing a freshness time associated with the data item with snapshot information associated with the transaction; and
the freshness time indicates a commit time of a committed transaction that most recently updated the first version of the data item within the first version of the data block.

22. The computer-readable medium of claim 21 further comprising instructions for performing the step of identifying the freshness time by performing the steps of:
determining whether the first version of the data item is locked;
if the first version of the data item is locked, then determining whether the transaction that holds a lock on the first version of the data item has actually committed; and
if the transaction that holds the lock on the first data item has actually committed, then using a commit time of said transaction that holds the lock as the freshness time of said data item.

23. The computer-readable medium of claim 21 further comprising instructions for performing the step of identifying the freshness time by performing the steps of:
determining whether the first version of the data item is locked;
if the first version of the data item is locked, then determining whether the transaction that holds a lock on the first version of the data item has actually committed; and
if the transaction that holds the lock on the first data item has not actually committed, then determining whether the transaction that holds the lock on the first data item is the transaction that requires the data item; and
if the transaction that holds the lock on the first data item is not the transaction that requires the data item, then determining that the first version of the data item is not useable by the transaction.

24. The computer-readable medium of claim 15 wherein:
the first version of the data item is established as one candidate of a plurality of candidates that are versions of the data item that are useable by the transaction; and
the computer-readable medium includes instructions to perform the step of selecting which candidate of the plurality of candidates to provide to said transaction.

25. The computer-readable medium of claim 15 wherein:
the transaction is a transaction performed within a multi-versioning database system; and
the data item is a row of a table within said database system.

26. The computer-readable medium of claim 24 wherein the step of selecting which candidate of the plurality of candidates to provide to said transaction is performed based on how the candidate affects a range associated with the transaction, wherein said range is bounded by a MUST-SEE time and a CANNOT-SEE time.

27. The computer-readable medium of claim 26 wherein the step of selecting which candidate of the plurality of candidates to provide is based on which candidate would result in the widest range for the transaction.

28. The computer-readable medium of claim 26 wherein the step of selecting which candidate of the plurality of candidates to provide is based on which candidate would result in the highest CANNOT-SEE time.

* * * * *